(12) United States Patent
Wang et al.

(10) Patent No.: US 12,449,697 B2
(45) Date of Patent: Oct. 21, 2025

(54) BACKLIGHT MODULE, DISPLAY MODULE AND DISPLAY APPARATUS

(71) Applicants: Chongqing BOE Optoelectronics Technology Co., Ltd., Chongqing (CN); BOE TECHNOLOGY GROUP CO., LTD., Beijing (CN)

(72) Inventors: Yu Wang, Beijing (CN); Wencheng Luo, Beijing (CN); Meilong Hu, Beijing (CN); Jinhong Zhang, Beijing (CN); Wenqi Quan, Beijing (CN); Wei Ran, Beijing (CN); Zhi Li, Beijing (CN); Hening Zhang, Beijing (CN); Bowen Xiong, Beijing (CN); Qiong Yuan, Beijing (CN); Xin Cen, Beijing (CN); Ke Liao, Beijing (CN); Yiming Cheng, Beijing (CN)

(73) Assignees: CHONGQING BOE OPTOELECTRONIC TECHNOLOGY CO., LTD., Chongqing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/552,796
(22) PCT Filed: Feb. 20, 2023
(86) PCT No.: PCT/CN2023/077073
§ 371 (c)(1),
(2) Date: Sep. 27, 2023
(87) PCT Pub. No.: WO2023/185312
PCT Pub. Date: Oct. 5, 2023

(65) Prior Publication Data
US 2025/0085590 A1    Mar. 13, 2025

(30) Foreign Application Priority Data
Mar. 31, 2022  (CN) .......................... 202210334476.3

(51) Int. Cl.
G02F 1/1335    (2006.01)
G02F 1/13357   (2006.01)

(52) U.S. Cl.
CPC .. *G02F 1/133612* (2021.01); *G02F 1/133603* (2013.01); *G02F 1/133607* (2021.01);
(Continued)

(58) Field of Classification Search
CPC ......... G02F 1/133612; G02F 1/133607; G02F 1/133628; G02F 1/133603; G02F 1/133608; G02F 1/133611
(Continued)

(56) References Cited

U.S. PATENT DOCUMENTS 7,742,121 B2 *   6/2010  Mori .................... G02B 6/0085
                                                              349/61
11,977,297 B2 *  5/2024  Cheng ............... G02F 1/133608
(Continued)

FOREIGN PATENT DOCUMENTS

CN    201378600 Y  *  1/2010
CN    107728365 A     2/2018
(Continued)

OTHER PUBLICATIONS

Espacenet English machine translation of CN201378600Y (Year: 2010).*

*Primary Examiner* — Michael H Caley
*Assistant Examiner* — David Y Chung
(74) *Attorney, Agent, or Firm* — XSENSUS LLP

(57) ABSTRACT

A backlight module includes a light-emitting substrate, at least one chip-on-film and a backplane. The light-emitting substrate includes a signal line group and a plurality of light-emitting units, and the plurality of light-emitting units are electrically connected to the signal line group. The at least one chip-on-film is arranged on a non-light exit side of the light-emitting substrate, and electrically connected to the signal line group. The backplane is disposed on the non-light exit side of the light-emitting substrate, and the at least one
(Continued)

chip-on-film is located between the backplane and the light-emitting substrate. The backplane is provided with a groove therein, a notch of the groove faces the light-emitting substrate, and at least portion of a chip-on-film film of the at least one chip-on-film is disposed in the groove.

19 Claims, 8 Drawing Sheets

(52) U.S. Cl.
CPC .. *G02F 1/133608* (2013.01); *G02F 1/133611* (2013.01); *G02F 1/133628* (2021.01)

(58) Field of Classification Search
USPC .................................. 349/58, 65, 149–150
See application file for complete search history.

(56) References Cited

U.S. PATENT DOCUMENTS

2019/0393433 A1  12/2019  Dagn et al.
2021/0263379 A1*  8/2021  Lee ................... G02F 1/133606

FOREIGN PATENT DOCUMENTS

| CN | 208255589 U | 12/2018 |
| CN | 208752347   | 4/2019  |
| CN | 217639870 U | 10/2022 |

* cited by examiner

BACKLIGHT MODULE, DISPLAY MODULE AND DISPLAY APPARATUS

CROSS-REFERENCE TO RELATED APPLICATIONS

This application is a national phase entry under 35 USC 371 of International Patent Application No. PCT/CN2023/077073, filed on Feb. 20, 2023, which claims priority to Chinese Patent Application No. 202210334476.3, filed on Mar. 31, 2022, which are incorporated herein by reference in their entirety.

TECHNICAL FIELD

The present disclosure relates to the field of display technologies, and in particular, to a backlight module, a display module and a display apparatus.

BACKGROUND

With the rise and maturity of organic light-emitting diode (OLED) technology, OLED products have gradually become a new favorite in the market. However, OLED products are expensive and have poor reliability. In order to achieve the characteristics such as high contrast, lightness and thickness comparable to OLED products, and is remain advantages in price and reliability of liquid crystal display (LCD) products, tiny LEDs emerged as backlight products.

The tiny LEDs include a micro light-emitting diode (micro LED) and mini light-emitting diode (mini LED). A size (e.g., a length) of the micro LED is less than 50 microns, for example, in a range of 10 microns to 50 microns; and a size (e.g., a length) of the mini LED is in a range of 50 microns to 150 microns, for example, in a range of 80 microns to 120 microns.

LCD panels with the tiny LED backlight have advantages of high peak brightness, high contrast, low power consumption, and high reliability, which have broad development prospects.

SUMMARY

In one aspect, a backlight module is provided. The backlight module includes a light-emitting substrate, at least one chip-on-film, and a backplane.

The light-emitting substrate includes a signal line group and a plurality of light-emitting units, and the plurality of light-emitting units are electrically connected to the signal line group. The at least one chip-on-film is arranged on a non-light exit side of the light-emitting substrate, and the at least one chip-on-film is electrically connected to the signal line group. The backplane is disposed on the non-light exit side of the light-emitting substrate, and the at least one chip-on-film is located between the backplane and the light-emitting substrate. The backplane is provided with a groove therein, a notch of the groove faces the light-emitting substrate, and at least portion of a chip-on-film film of the at least one chip-on-film is disposed in the groove.

In some embodiments, the chip-on-film includes a flexible film and at least one driver chip. The flexible film is electrically connected to the signal line group. The at least one driver chip is electrically connected to the flexible film, and the at least one driver chip is arranged in the groove.

In some embodiments, a sidewall of the groove is of a stepped structure; in a thickness direction of the light-emitting substrate and from the notch to a bottom surface of the groove, the sidewall of the groove includes a first sub-wall, a stepped surface and a second sub-wall that are connected in sequence, and the first sub-wall and the second sub-wall both intersect with the stepped surface.

The groove includes at least one first sub-groove and at least one second sub-groove, a first sub-groove of the at least one first sub-groove includes the first sub-wall and the stepped surface, and a second sub-groove of the at least one second sub-groove includes the second sub-wall and at least portion of the bottom surface of the groove. A driver chip of the at least one driver chip is arranged in the second sub-groove, and at least portion of the flexible film is arranged in the first sub-groove.

In some embodiments, the groove includes a plurality of second sub-grooves arranged in a first direction; the first direction is parallel to an extending direction of a side edge of a bonding side of the light-emitting substrate. The backlight module includes a plurality of the chip-on-films, and the plurality of the chip-on-films are arranged in sequence in the first direction. Each of the plurality of chip-on-films includes at least one driver chip, and all driver chips included in a same chip-on-film are disposed in a same second sub-groove.

In some embodiments, the plurality of chip-on-films are of a one-piece structure.

In some embodiments, the groove includes a plurality of first sub-grooves, and the first sub-grooves and the second sub-grooves are arranged alternately in the first direction. Each of the plurality of chip-on-films further includes a flexible film; of each of the plurality of chip-on-films, two side edges of the flexible film respectively exceed two side edges of the at least one driver chip in the first direction, and the two side edges of the flexible film are respectively located in two first sub-grooves located on two sides of a second sub-groove where the at least one driving chip is located.

In some embodiments, the backlight module further includes a heat dissipation layer disposed between the bottom surface of the groove and the at least one driver chip, and the heat dissipation layer is connected to the bottom surface of the groove.

In some embodiments, the backplane includes a backplane body, the backplane body is disposed around the groove, and a top of a sidewall of the groove is connected to the backplane body. In a thickness direction of the light-emitting substrate, a bottom surface of the groove is farther away from the light-emitting substrate than the backplane body.

In some embodiments, the backlight module further includes a flexible circuit board, an end of the flexible circuit board being electrically connected to the light-emitting substrate. The backplane is provided with a first opening therein, and another end of the flexible circuit board passes through the first opening and extends to a side of the backplane away from the light-emitting substrate.

In some embodiments, the first opening is located at a side of the groove proximate to a side edge of a bonding side of the light-emitting substrate.

In some embodiments, the backlight module further includes a first fixed adhesive layer disposed between the light-emitting substrate and the backplane, and the first fixed adhesive layer is arranged avoiding the groove and the at least one chip-on-film.

In some embodiments, the backlight module further includes an optical adjustment film and a mold frame. The optical adjustment film is disposed on a light exit side of the light-emitting substrate. The mold frame is arranged around the optical adjustment film, and the mold frame is disposed on the light exit side of the light-emitting substrate.

In some embodiments, the backlight module further includes a second fixed adhesive layer disposed between the light-emitting substrate and the mold frame.

In some embodiments, the light-emitting substrate has a bonding side, and each of the at least one chip-on-film is bonded to the light-emitting substrate at the bonding side of the light-emitting substrate.

In another aspect, a display module is provided. The display module includes a display panel and the backlight module described in any of the above embodiments. The display panel is disposed on a light exit side of the backlight module.

In some embodiments, the display module further includes a circuit board disposed on a side of the backlight module away from the display panel and disposed at a side of the groove of the backplane of the backlight module. The backlight module further includes a flexible circuit, and the circuit board is electrically connected to the flexible circuit board of the backlight module.

In some embodiments, a thickness of the groove is approximately equal to a thickness of the circuit board.

In some embodiments, the display module further includes a third flexible circuit board, and the display panel is electrically connected to the circuit board through the third flexible circuit board.

In some embodiments, the display module further includes a connector disposed on a side of the circuit board away from the backlight module; the flexible circuit board is inserted into the connector.

In another aspect, a display apparatus is provided. The display apparatus includes the display module described in any of the above embodiments.

BRIEF DESCRIPTION OF THE DRAWINGS

In order to describe technical solutions in the present disclosure more clearly, the accompanying drawings to be used in some embodiments of the present disclosure will be introduced briefly. Obviously, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
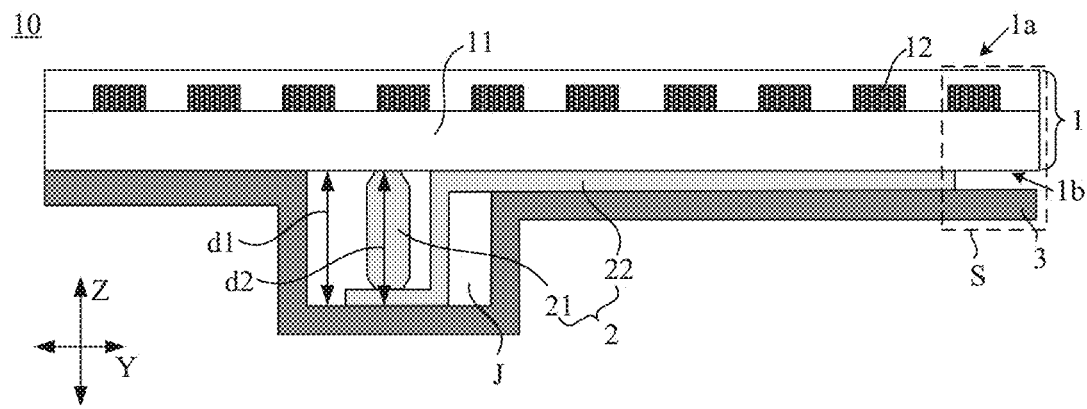
FIG. 1 is a structural diagram of a backlight module, in accordance with some embodiments.

The technical solutions in some embodiments of the present disclosure will be described clearly and completely with reference to the accompanying drawings. Obviously, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the expressions "electrically connected" and "connected" and derivatives thereof may be used. For example, the term "electrically connected" may be used in the description of some embodiments to indicate that two or more components are in direct physical contact or electrical contact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "configured to" used herein means an open and inclusive expression, which does not exclude devices that are applicable to or configured to perform additional tasks or steps.

The term such as "about", "substantially" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

The term such as "parallel", "perpendicular" or "equal" as used herein includes a stated case and a case similar to the stated case within an acceptable range of deviation determined by a person of ordinary skill in the art, considering measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°; and the term "equal" includes absolute equality and approximate equality, and an acceptable range of deviation of the approximate equality may be, for example, that a difference between two equals is less than or equal to 5% of either of the two equals.

It will be understood that, when a layer or element is referred to as being on another layer or substrate, it may be that the layer or element is directly on the another layer or substrate, or it may be that intervening layer(s) exist between the layer or element and the another layer or substrate.

Exemplary embodiments are described herein with reference to sectional views and/or plan views as idealized exemplary drawings. In the drawings, thicknesses of layers and sizes of regions are enlarged for clarity. Thus, variations in shapes relative to the accompanying drawings due to, for example, manufacturing technologies and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a feature of being curved. Therefore, the regions shown in the accompanying drawings are schematic in nature, and their shapes are not intended to show actual shapes of the region in a device, and are not intended to limit the scope of the exemplary embodiments.

In the related arts, Mini LED backlight modules mostly adopt a passive driving mode.

In the backlight module adopting the passive driving mode, an output channel of the driver chip lights up multiple light-emitting units in the light-emitting substrate in a time-division manner, and the cost of the backlight module is relatively low. Mini LED display apparatuses adopting the passive driving mode have many defects, and the specific defects are as follows:

1. The refresh frequency is low, and there will be a risk of flickering during the display process;
2. There is a large signal delay problem;
3. There is a serious howling problem;
4. The backlight module requires a large layout space, and the circuit board assembled with the backlight module has a relatively large size accordingly;
5. Power consumption is high, and more heat is generated, which is easy to cause problems such as film swelling and a clearing point of the display apparatus;
6. The number of wires in backlight module is large, and the number of pins corresponding to the wires is large accordingly, so that the backlight module is difficult to be assembled with the circuit board through the pins, and the yield is low; and
7. The backlight module has a weak structural strength and generates a large deformation due to the action of external forces.

In order to solve the above problems, as shown in FIG. 1, the embodiments of the present disclosure provide a backlight module 10, and the backlight module 10 includes a light-emitting substrate 1, chip-on-film(s) 2 and a backplane 3.

For example, as shown in FIG. 1, the light-emitting substrate 1 includes a light exit side 1a and a backlight side 1b. The light exit side 1a is a side where the light-emitting substrate 1 emits light, and the light generated by the light-emitting substrate 1 exit from the light-emitting side 1a; the backlight side 1b is a side facing away from the light exit side 1a.

Figure 2:
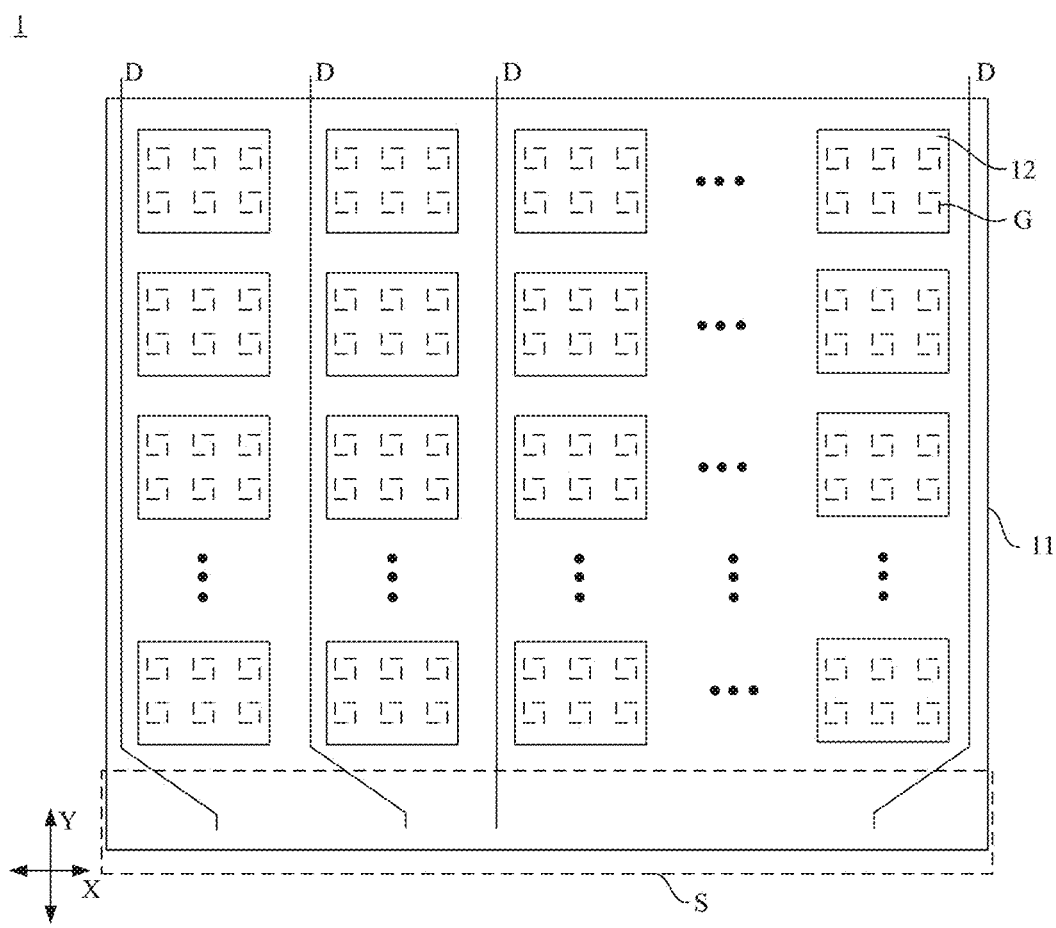
FIG. 2 is a top view of a light-emitting substrate, in accordance with some embodiments.

As shown in FIG. 2, the light-emitting substrate 1 includes a signal line group 11 and a plurality of light-emitting units 12.

For example, as shown in FIG. 2, the signal line group 11 may include a plurality of signal lines D.

The signal lines D are configured to transmit light emission control signals.

The signal lines D are electrically connected to the respective light-emitting units 12, so as to drive the light-emitting units 12 to emit light. For example, each signal line D is electrically connected to a light-emitting unit 12, so that individual control for each light-emitting unit 12 may be achieved.

For example, the light-emitting unit 12 may include at least one light-emitting element G, and the at least one light-emitting element G are electrically connected to each other. For example, a plurality of light-emitting elements G in a light-emitting unit 12 may have two connection structures of "one-parallel-multi-series" and/or "multi-parallel-multi-series".

The connection structure of "one-parallel-multi-series" may be understood as that all the light-emitting elements G in a light-emitting unit 12 are connected in series. Correspondingly, the connection structure of "multi-series-multi-parallel" may be understood as that a light-emitting unit 12 includes at least two light-emitting element strings, and at least one light-emitting element string includes at least two light-emitting elements G connected in series; all light-emitting element strings in a light-emitting unit 12 are connected in parallel.

For example, a plurality of light-emitting elements G in a light-emitting unit 12 may be arranged in a rectangle, a rhombus, and the like, which is not limited here. In addition, the number of light-emitting elements G in a light-emitting unit 12 may be 4, 6, 8, 16, and the like, which is not limited here.

For example, the light-emitting elements G in a light-emitting unit 12 emit light synchronously under a control of a same light emission control signal, so that the luminance of all the light-emitting elements G in a light-emitting unit 12 is the same or substantially the same.

For example, the light-emitting element G may be a mini LED or a micro LED.

By arranging the signal line group 11, i.e., adopting an active driving mode, the defects mentioned above of the display apparatus adopting the passive driving mode may be effectively resolved.

For example, the active driving mode may achieve the individual control of each light-emitting unit 12, so that the refresh frequency of the display apparatus may be increased, and the frequency band that can be heard by the human ear may be avoided, so as to solve the problem of howling of the display apparatus. Moreover, for the active driving mode, the power consumption is low, and less heat is generated, which may solve the problem of film swelling and the clearing point of the display apparatus, so that the service life of the display apparatus may be effectively improved. In addition, in the display apparatus with the active driving mode, the layout in the light-emitting substrate 1 is simple, and the number of pins that need to be assembled with the circuit board is small, which reduces the difficulty of assembly and improves the product yield.

On this basis, as shown in FIG. 1, the chip-on-film 2 is disposed on the non-light exit side, i.e., the backlight side 1b, of the light-emitting substrate 1.

The chip-on-film 2 is electrically connected to the signal line group 11 described above.

The chip-on-film 2 is configured to provide light emission control signals for the light-emitting units 12 through the signal line group 11, so that the light emission control of the light-emitting units 12 may be achieve.

For example, the chip-on-film 2 includes a plurality of output channels, and each output channel is electrically connected to a light-emitting unit 12 through the signal line group 11 in one-to-one correspondence. During the refresh time of one frame of the display apparatus, the output channels of the chip-on-film 2 continuously output the light emission control signals to the respective light-emitting units 12.

For example, the chip-on-film 2 is electrically connected to the signal lines D in the signal line group 11, so that the light emission control signals are transmitted to the light-emitting units 12 through the respective signal lines D, so as to achieve the light emission control of the light-emitting elements G in the light-emitting unit 12.

For example, an end of the signal line D in the signal line group 11 is electrically connected to the light-emitting element(s) G in the light-emitting unit 12, and the other end is arranged as a pin on the backlight side 1b of the light-emitting substrate 1 and located at a bonding side S of the light-emitting substrate 1. The output channels of the chip-on-film 2 are bonded to the pins of the signal lines D in the signal line group 11.

As shown in FIG. 1, the backplane 3 is disposed on the non-light exit side, i.e., the backlight side 1b, of the light-emitting substrate 1, and the chip-on-film 2 is disposed between the light-emitting substrate 1 and the backplane 3.

The backplane 3 is configured to: protect, as a protective shell, components such as the light-emitting substrate 1 from bumps and damages from external structures; and avoid, as a support structure, a poor display of the display apparatus caused by the deformation of the backlight module 10. Thus, the strength of the display apparatus is improved.

As shown in FIG. 1, the backplane 3 is provided with a groove J therein, and a notch of the groove J is arranged facing the light-emitting substrate 1. At least portion of the chip-on-film 2 is disposed in the groove J.

It will be noted that the chip-on-film 2 is a structure for connecting a driver chip to a flexible circuit board by using a flexible film provided with signal lines as a carrier for encapsulating the driver chip. Therefore, referring to FIG. 1, the thickness (that is, a dimension in a thickness direction Z of the light-emitting substrate 1) of the chip-on-film 2 at different positions is different.

For example, a portion of the chip-on-film 2 in which the driver chip is encapsulated is disposed in the groove J, which may effectively protect the driving chip from external bumps and damages during the assembly process of the display apparatus.

For example, as shown in FIG. 1, a depth d1 (that is, a dimension in the thickness direction Z of the light-emitting substrate 1) of the groove J is greater than or equal to a maximum thickness d2 (that is, the dimension in the thickness direction Z of the light-emitting substrate 1) of the portion of the chip-on-film 2 in which the driver chip is encapsulated.

By setting the groove J in the backplane 3, and arranging at least portion of the chip-on-film 2 in the groove J, for example, arranging the portion of the chip-on-film 2 in which the driver chip is encapsulated in the groove J, it is possible to provide a space for the chip-on-film 2, especially the portion of the chip-on-film 2 in which the driver chip is encapsulated, so as to protect important components (e.g., the driver chip) in the chip-on film 2 from being damaged during the subsequent assembly process of the display apparatus.

In exemplary embodiments, as shown in FIG. 1, the chip-on-film 2 includes a flexible film 22 and a driver chip 21.

It will be noted that the chip-on-film 2 is a structure for connecting the driver chip 21 to the flexible film 22 by using the flexible film 22 provided with signal lines as a carrier for encapsulating the driver chip 21. The structure of the chip-on-film 2 in the drawings of the present disclosure is merely a schematic representation, and does not limit the actual structure of the chip-on-film 2.

The flexible film 22 is electrically connected to the signal line group 11.

For example, the flexible film 22 includes a plurality of output channels.

For example, the flexible film 22 may be electrically connected to the signal lines D in the signal line group; for example, an end of the output channel of the flexible film 22 is exposed and is bonded to the pin of the signal line D.

The driver chip 21 is electrically connected to the flexible film 22; for example, the other end of the output channel of the flexible film 22 is electrically connected to the driver chip 21. The light emission control signals in the driver chip 21 are transmitted to the signal line group 11 through the flexible film 22, and then transmitted to the respective light-emitting units 12 to achieve the light emission control of the light-emitting elements G.

For example, the driver chip 21 may be a light emission control chip, and the driver chip 21 may be configured to transmit the light emission control signals to the signal line group 11 and then to the respective light-emitting units 12, so as to achieve the light emission control of the light-emitting elements G in the light-emitting units 12.

As shown in FIG. 1, the driver chip 21 is arranged in the groove J.

For example, as shown in FIG. 1, a volume of the groove J may be greater than or equal to a volume of the driver chip 21.

It will be noted that "the driver chip 21 is arranged in the groove J" may be understood as that the portion of the chip-on-film 2 provided with the driver chip 21 is arranged in the groove J, that is, in addition to the driver chip 21 being arranged in the groove J, the portion of the flexible film 22 used to encapsulate the driver chip 21 is also disposed in the groove J accordingly.

By arranging the driver chip 21 in the groove J, it is possible to prevent the driver chip 21 from being damaged from the outside during the subsequent assembly process of the display apparatus.

Figure 3:
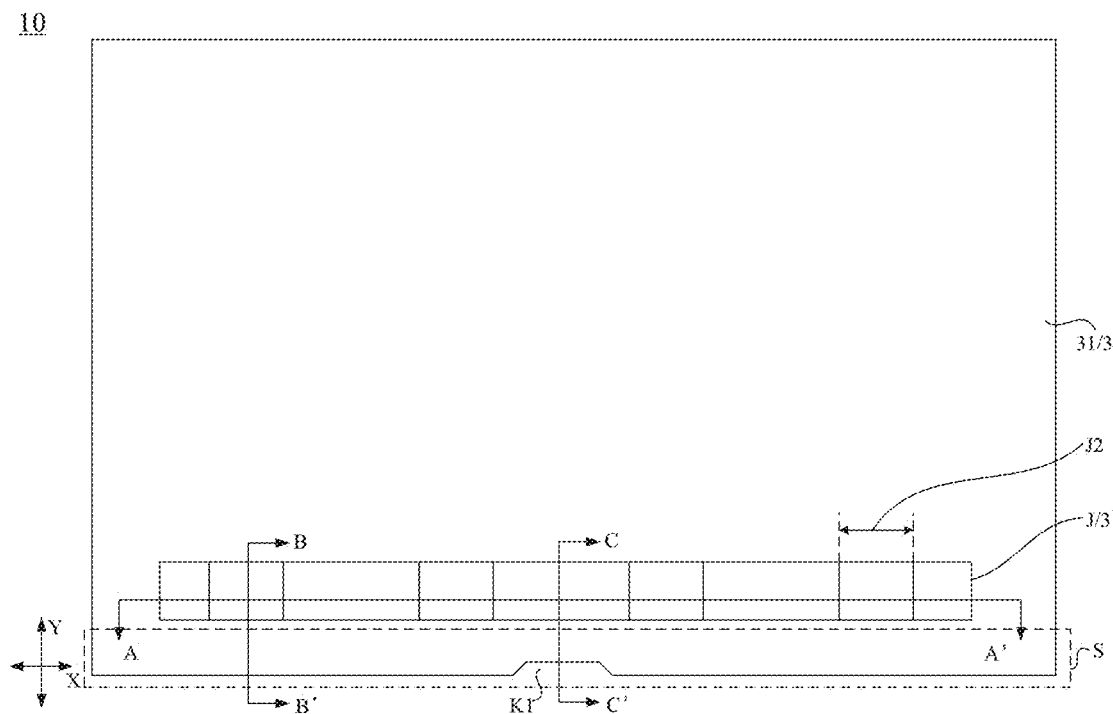
FIG. 3 is a rear view of a backlight module, in accordance with some embodiments.

FIG. 3 shows a rear view of the backlight module 10. In some embodiments, as shown in FIG. 3, the groove J is in a shape of a strip, and a length direction (with reference to a first direction X in FIG. 5) of the groove J is the same as an extending direction of a side edge of the bonding side S (as shown in FIGS. 1 and 2) of the light-emitting substrate 1.

The bonding side S of the light-emitting substrate 1 is a side where the light-emitting substrate 1 is bonded to the chip-on-film 2.

For example, as shown in FIG. 3, the groove J is arranged on a side of the backplane 3 corresponding to the bonding side S of the light-emitting substrate 1.

Figure 4:
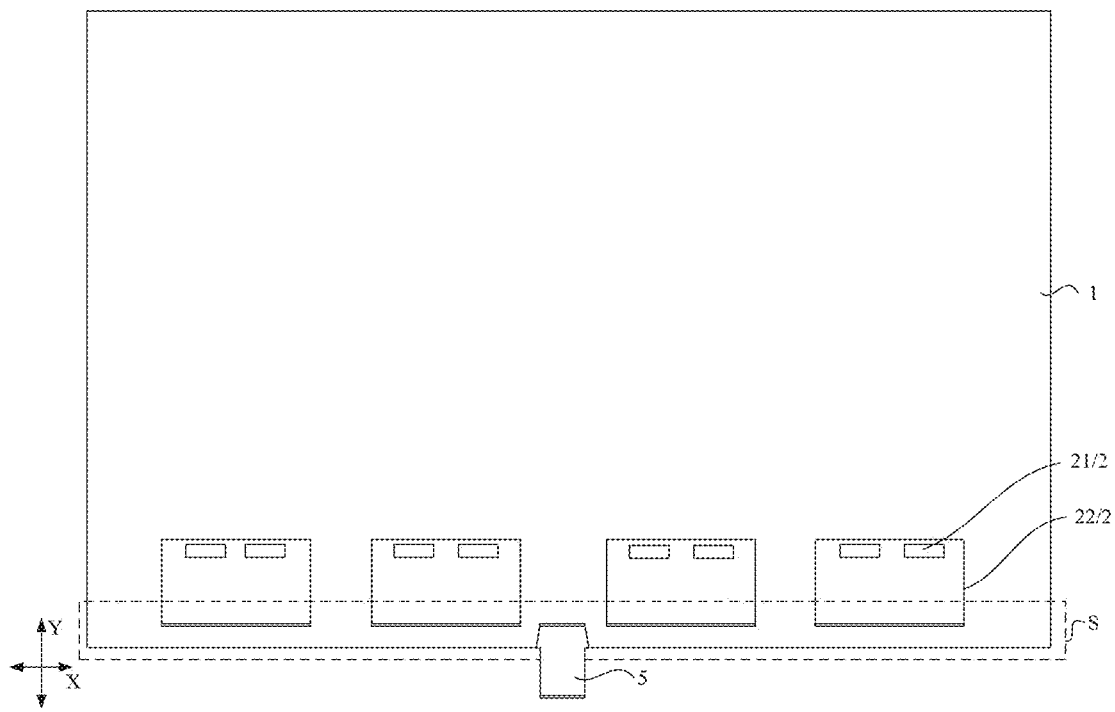
FIG. 4 is a rear view of a light-emitting substrate provided with a chip-on-film on a backlight side thereof, in accordance with some embodiments.

FIG. 4 shows a structural diagram of the light-emitting substrate 1 provided with the chip-on-film on the backlight side thereof. In some embodiments, as shown in FIG. 4, the backlight module 10 includes a plurality of chip-on-films 2 arranged in sequence in the first direction X.

For example, each chip-on-film 2 includes at least one driver chip 21. For example, as shown in FIG. 4, each chip-on-film 2 includes two driver chips 21.

For example, as shown in FIG. 4, each chip-on-film 2 is bonded to the light-emitting substrate 1 at the bonding side S of the light-emitting substrate 1.

For example, the plurality of chip-on-films 2 may be of a one-piece structure. For example, there is a flexible film material between two adjacent chip-on-films 2, and no wiring is arranged in the flexible film material between two adjacent chip-on-films 2.

Figure 5:
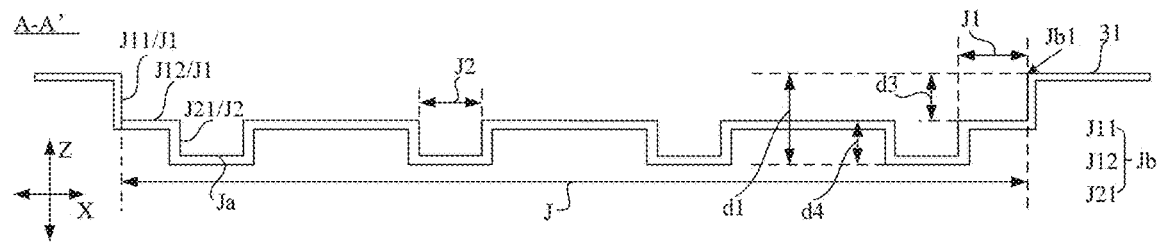
FIG. 5 is a sectional view of a backplane in FIG. 3 taken along the section line A-A'.
Figure 7:
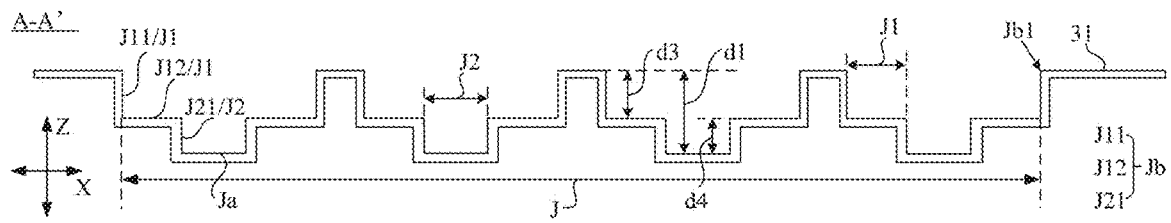
FIG. 7 is another sectional view of a backplane in FIG. 3 taken along the section line A-A'.

In some embodiments, as shown in FIGS. 5 and 7, a sidewall Jb of the groove J is of a stepped structure, and in the thickness direction Z of the light-emitting substrate 1 and from the notch of the groove J to a bottom surface Ja of the groove J, the sidewall Jb of the groove J includes a first sub-wall J11, a stepped surface J12 and a second sub-wall J21 that are connected in sequence.

It will be noted that the term "bottom surface Ja" refers to a surface of the groove J that is substantially perpendicular to the thickness direction Z of the light-emitting substrate 1 and farthest from the light-emitting substrate 1.

It will be noted that the term "sidewall Jb" includes, all portions of the groove J that are substantially perpendicular to a side surface of the light-emitting substrate 1 and connecting two side surfaces. That is, referring to FIG. 7, the sidewall Jb includes the first sub-wall J11, the stepped surface J12 and the second sub-wall J21 that are connected in sequence.

As shown in FIGS. 5 and 7, both the first sub-wall J11 and the second sub-wall J21 intersect with the stepped surface J12. For example, both the first sub-wall J11 and the second sub-wall J21 are perpendicular to the stepped surface J12.

As shown in FIGS. 5 and 7, the groove J includes first sub-grooves J1 and second sub-grooves J2; a first sub-groove J1 includes the first sub-wall J11 and the step surface J12, and a second sub-groove J2 includes the second sub-wall J21 and at least portion of the bottom surface Ja of the groove J.

For example, the first sub-grooves J1 and the second sub-grooves J2 are integrally formed.

Figure 6:
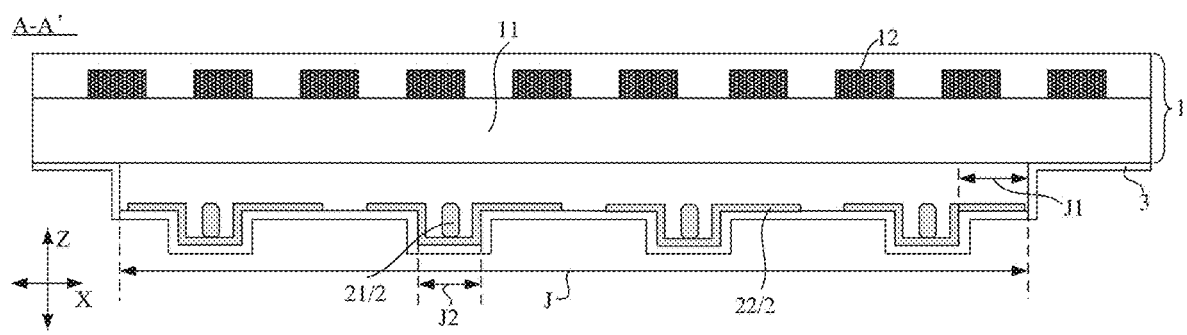
FIG. 6 is a sectional view of the backlight module in FIG. 3 taken along the section line A-A'.

As shown in FIG. 6, the driver chip 21 is arranged in the second sub-groove J2, and at least portion of the flexible film 22 is arranged in the first sub-groove J1.

By setting the groove J to include the first sub-grooves J1 and the second sub-grooves J2, arranging the driver chip 21 in the second sub-groove J2, and arranging at least portion of the flexible film 22 in the first sub-groove J1, i.e., by designing the shape of the groove J to match the shape of the chip-on-film 2, the portion of the chip-on-film 2 in which the driver chip 21 is arranged and another portion of the chip-on-film 2 around the driver chip 21 may be flatly laid in the groove J, which may reduce the positions of folding or wrinkling when the chip-on-film 2 is placed in the groove J, thereby reducing the risk of damage to the chip-on-film 2 and improving the service life of the backlight module 10.

For example, as shown in FIGS. 5 and 7, the maximum depth d1 (the dimension in the thickness direction Z of the light-emitting substrate 1) of the groove J may be in a range of 0.8 mm to 1.2 mm, inclusive, such as 1 mm; for example, a depth d3 of the first sub-groove J1 is approximately in a range of 0.4 mm to 0.6 mm, such as 0.5 mm; a depth d4 of the second sub-groove J2 is approximately in a range of 0.4 mm to 0.6 mm, such as 0.5 mm.

In exemplary embodiments, as shown in FIGS. 5 and 6, the groove J includes a plurality of second sub-grooves J2 arranged in the first direction X.

The first direction X is parallel to the extending direction of the side edge of the bonding side S of the light-emitting substrate 1.

As shown in FIG. 6, the backlight module 10 includes a plurality of chip-on-films 2 arranged in sequence in the first direction X.

Each chip-on-film 2 includes at least one driver chip 21. For example, as shown in FIG. 6, each chip-on-film 2 includes one driver chip 21.

All driver chips 21 included in a same chip-on-film 2 are arranged in a same second sub-groove J2.

Optionally, each chip-on-film 2 includes two driver chips 21, and the two driver chips 21 are spaced in a same second sub-groove J2.

Optionally, the plurality of chip-on-films 2 may be of a one-piece structure.

By providing the plurality of second sub-grooves J2 arranged in the first direction X, and arranging the driver chip 21 in the second sub-groove J2, it is possible to make the plurality of chip-on-films 2 match the shape of the groove J in a case where the backlight module 10 includes the plurality of chip-on-films 2, so that the driver chips 21 may be all arranged in the groove J, and the chip-on-films 2 may be flatly laid in the groove J. Thus, it may be possible to reduce the positions of folding or wrinkling when the chip-on-films 2 are placed in the groove J, thereby reducing the risk of damage to the chip-on-films 2 and improving the service life of the backlight module 10.

In exemplary embodiments, as shown in FIG. 7, the groove J includes a plurality of first sub-grooves J1, and the first sub-grooves J1 and the second sub-grooves J2 are arranged alternately in the first direction X.

For example, in the first direction X, at least one first sub-groove J1 is disposed between two adjacent second sub-grooves J2.

Figure 8:
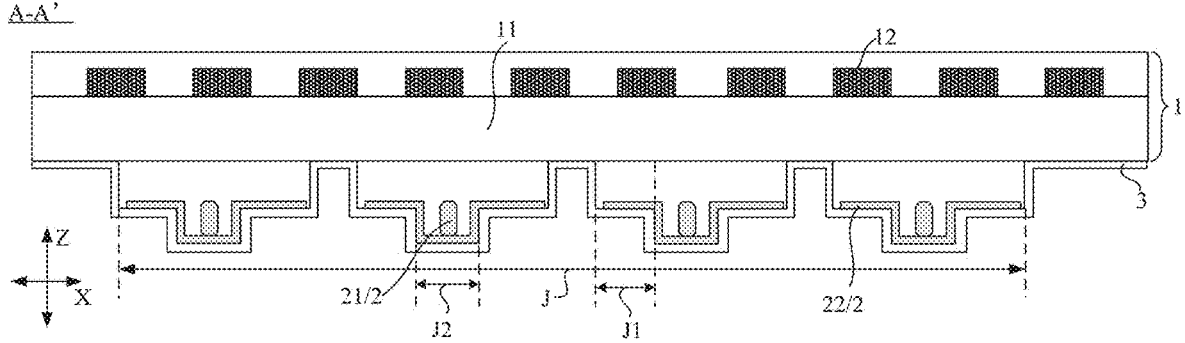
FIG. 8 is another sectional view of the backlight module in FIG. 3 taken along the section line A-A'.

As shown in FIG. 8, of each chip-on-film 2, two side edges of the flexible film 22 respectively exceed two side edges of the driver chip 21 in the first direction X, and the two side edges of the flexible film 22 are respectively located in two first sub-grooves J1 located on two sides of the second sub-groove J2 where the driving chip 21 is located.

By providing the first sub-grooves J1 and the second sub-grooves J2 that are arranged alternately in the first direction X, and arranging the driver chip 21 in the second sub-groove J2, it is possible to make the plurality of chip-on-films 2 match the shape of the groove J in a case where the backlight module 10 includes the plurality of chip-on-films 2, so that the driver chips 21 may be all arranged in the groove J, and the chip-on-films 2 may be flatly laid in the groove J. Thus, it may be possible to reduce the positions of folding or wrinkling when the chip-on-films 2 are placed in the groove J, thereby reducing the risk of damage to the chip-on-films 2 and improving the service life of the backlight module 10.

In some embodiments, as shown in FIGS. 5 and 7, the backplane 3 includes a backplane body 31, the backplane body 31 is arranged around the groove J (as shown in FIG. 5), and a top Jb1 of the sidewall Jb of the groove J is connected to the backplane body 31. In the thickness direction Z of the light-emitting substrate 1, the bottom surface Ja of the groove J is farther away from the light-emitting substrate 1 than the backplane body 31.

That is, the groove J protrudes toward a direction away from the light-emitting substrate 1 relative to the backplane body 31.

For example, the groove J and the backplane body 31 are of a one-piece structure.

By providing the groove J in the backplane 3, and making the bottom surface Ja of the groove J is farther away from the light-emitting substrate 1 than the backplane body 31, thereby providing a placement space for the driver chips 21 to protect the driver chips 21 from damage. Moreover, the groove J may also be used as a reinforcing rib extending in the first direction X of the backplane 3 to enhance the strength of the backplane 3, which may prevent the backlight module 10 from being deformed, and especially prevent the backlight module 10 from bending in the direction Y perpendicular to the first direction X, thereby improving the product yield of the display apparatus and prolonging the service life of the display apparatus.

Figure 9:
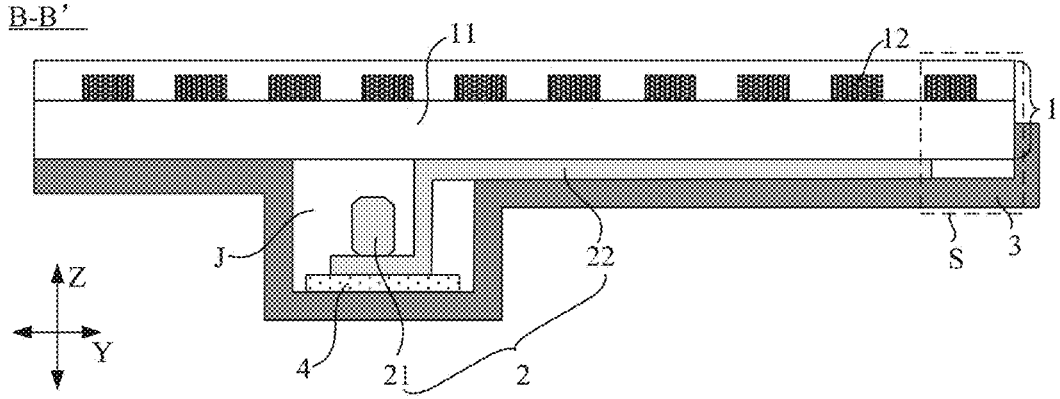
FIG. 9 is a sectional view of the backlight module in FIG. 3 taken along the section line B-B'.

In some embodiments, as shown in FIG. 9, the backlight module 10 further includes a heat dissipation layer 4 disposed between the bottom surface Ja of the groove J and the driver chip 21, and the heat dissipation layer 4 is connected to the bottom surface Ja of the groove J.

For example, the heat dissipation layer 4 is bonded to the bottom surface Ja of the groove J by an adhesive. That is, the adhesive is provided on a side of the heat dissipation layer 4 proximate to the bottom surface Ja, which may achieve the fixing of the heat dissipation layer 4 and prevent the driver chip 21 from being in contact with the adhesive, thereby preventing the heat dissipation effect from being affected caused by the poor heat conduction between the heat dissipation layer 4 and the driver chip 21.

The driver chip 21 may be dissipated by the heat dissipation layer 4, so as to prevent the driver chip 21 and other structures from being damaged caused by a large amount of heat generated by the driver chip 21 during operation, thereby improving the service life of the backlight module 10.

Figure 11:
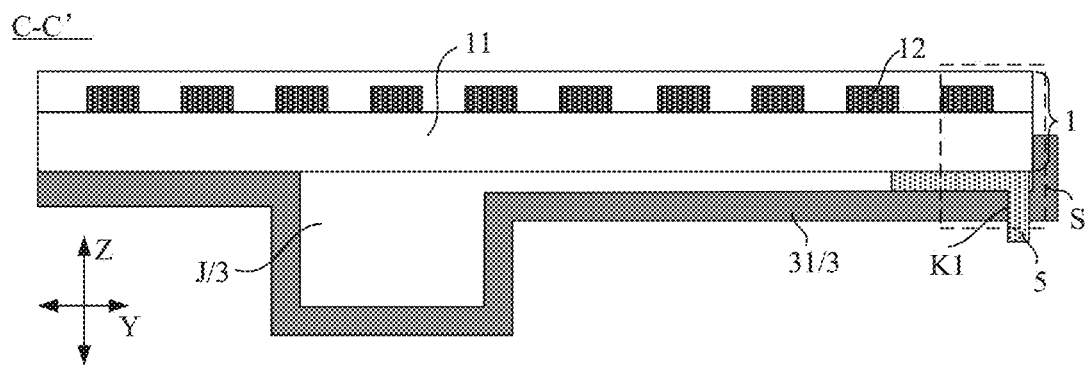
FIG. 11 is a sectional view of the backlight module in FIG. 3 taken along the section line C-C'.

In some embodiments, as shown in FIGS. 4 and 11, the backlight module 10 further includes a flexible circuit board (also referred to as a second flexible circuit board below to distinguish different flexible circuit boards) 5, and an end of the second flexible circuit board 5 is electrically connected to the light-emitting substrate 1.

In exemplary embodiments, the second flexible circuit board 5 may be configured to transmit a power supply signal (e.g., a positive voltage) to the light-emitting elements G in the light-emitting units 12.

For example, the second flexible circuit board 5 may be electrically connected to the light-emitting units 12 in the light-emitting substrate 1.

For example, the signal line group 11 further includes power supply lines, and the second flexible circuit board 5 are electrically connected to the light-emitting units 12 through the respective power supply lines.

An end of the power supply line is electrically connected to an anode of the light-emitting element G in the light-emitting unit 12, and the other end of the power supply line is disposed on the backlight side 1b of the light-emitting substrate 1 as a pin and bonded to a line in the second flexible circuit board 5, so that the power supply signal may be transmitted to the light-emitting element G in the light-emitting unit 12, so as to achieve the light emission of the light-emitting element G.

In exemplary embodiments, the second flexible circuit board 5 may further be configured to transmit a control signal to the chip-on-film 2.

For example, the second flexible circuit board 5 may be electrically connected to the chip-on-film 2 by a control signal line located in the light-emitting substrate 1, and the second flexible circuit board 5 transmits the control signal to the chip-on-film 2 through the control signal line, so as to achieve the control for the driver chip 21 in the chip-on-film 2.

In exemplary embodiments, the other end of the second flexible circuit board 5 may be electrically connected to an external structure (e.g., a circuit board or a timing controller), so that the power supply signal and/or control signal transmitted from the external structure is transmitted to the light-emitting substrate 1 through the second flexible circuit board 5, so as to achieve the light emission of the light-emitting elements G in the light-emitting units 12 of the light-emitting substrate 1.

Figure 10:
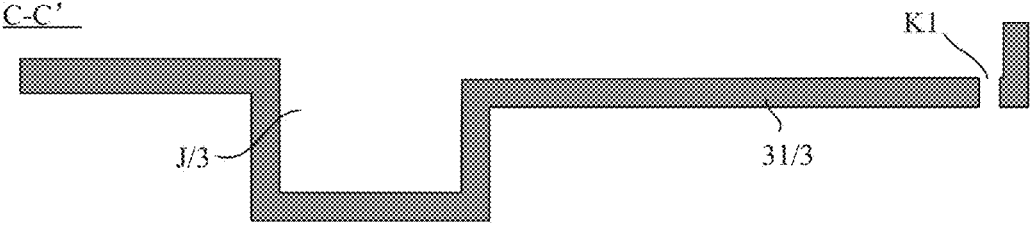
FIG. 10 is a sectional view of a backplane in FIG. 3 taken along the section line C-C'.

As shown in FIGS. 3 and 10, the backplane 3 is provided with a first opening K1 therein.

For example, as shown in FIGS. 10 and 11, an end of the backplane 3 is bent toward a direction close to the light-emitting substrate 1. Thus, each film layer structure of the backlight module 10 may be fixed in the frame of the backplane 3; furthermore, the strength of the side edge of the backplane 3 may be improved, thereby avoiding the defects such as dents or cracks on the side edge of the backlight module 10.

As shown in FIG. 11, the other end of the second flexible circuit board 5 passes through the first opening K1 and extends to the side of the backplane 3 away from the light-emitting substrate 1.

For example, the second flexible circuit board 5 is electrically connected to an external structure such as a circuit board after extending to the side of the backplane 3 away from the light-emitting substrate 1, so that the electrical signals from the external structure are transmitted to the light-emitting substrate 1 through the second flexible circuit board 5.

For example, the second flexible circuit board 5 may include 39 pins.

In the related art, the backlight module adopting the passive driving mode requires a large number of pins to be electrically connected to the external structure such as a circuit board; for example, the number of the pins is 300; at least three second flexible circuit boards are required to achieve the electrical connection between the light-emitting substrate and the circuit board, and the backplane in the related art needs to be provided with at least three first openings accordingly, which reduces the structural strength of the backplane.

In the embodiments provided by the present disclosure, the signal line group 11 in the light-emitting substrate 1 requires a small number of pins to be electrically connected to an external structure such as a circuit board, so that one second flexible circuit board 5 may achieve the electrical connection between the light-emitting substrate 1 and the external structure such as circuit boards. Thus, the backplane 3 only needs to design a single first opening K1, which effectively improves the structural strength of the backplane 3, thereby improving the structural strength of the backlight module 10.

In exemplary embodiments, as shown in FIG. 11, the first opening K1 is located at a side of the groove J proximate to the side edge of the bonding side S of the light-emitting substrate 1. That is, the second flexible circuit board 5 is bonded to the light-emitting substrate 1 on the bonding side S of the light-emitting substrate 1, and all bonding processes for the backlight module 10 (e.g., the bonding of the chip-on-film 2 and the light-emitting substrate 1, and the bonding of the second flexible circuit board 5 and the light-emitting substrate 1) are completed at the bonding side S, which may reduce the difficulty of the process and improve the manufacturing efficiency of the backlight module 10.

Figure 12:
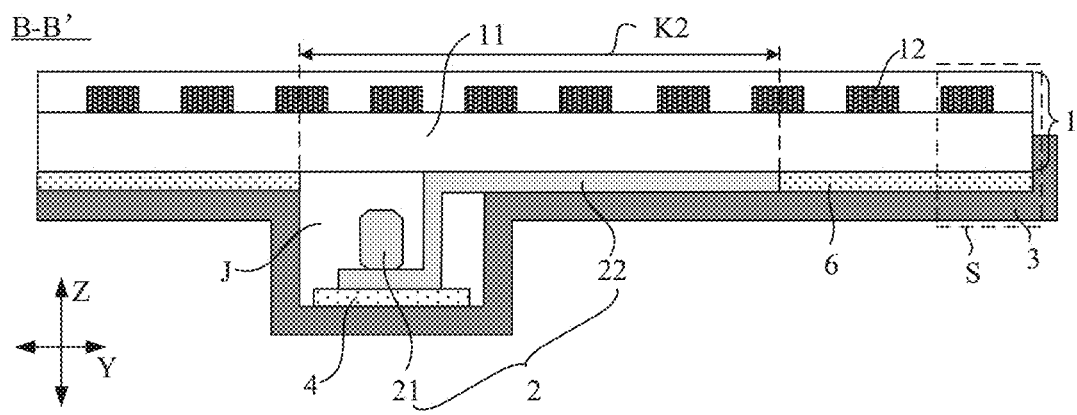
FIG. 12 is another sectional view of the backlight module in FIG. 3 taken along the section line B-B'.

In some embodiments, as shown in FIG. 12, the backlight module 10 further includes a first fixed adhesive layer 6 disposed between the light-emitting substrate 1 and the backplane 3.

The first fixed adhesive layer 6 is arranged avoiding the groove J and the chip-on-film 2.

For example, as shown in FIG. 12, the first fixed adhesive layer 6 is provided with a second opening K2 therein, so that the material of the first fixed adhesive layer 6 can avoid the groove J and the chip-on-film 2, and the material of the first fixed adhesive layer 6 is prevented from damaging the chip-on-film 2 or affecting the heat dissipation between the driver chip 21 and the flexible film 22 in the chip-on-film 2.

Figure 17:
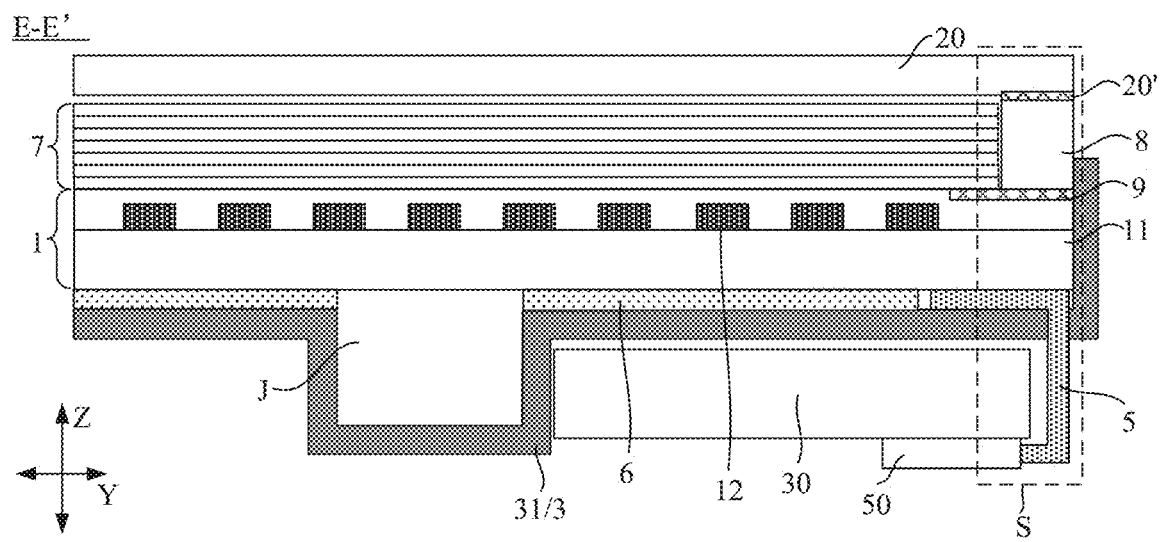
FIG. 17 is a sectional view of the backlight module in FIG. 14 taken along the section line E-E'.

For example, the first fixed adhesive layer 6 is also arranged to avoid the second flexible circuit board 5 (referring to FIG. 17).

The provision of the first fixed adhesive layer 6 may enable the light-emitting substrate 1 to be fixed to the backplane 3, so as to avoid loosening of various components in the backlight module 10 and complete the assembly of the backlight module 10.

Figure 13:
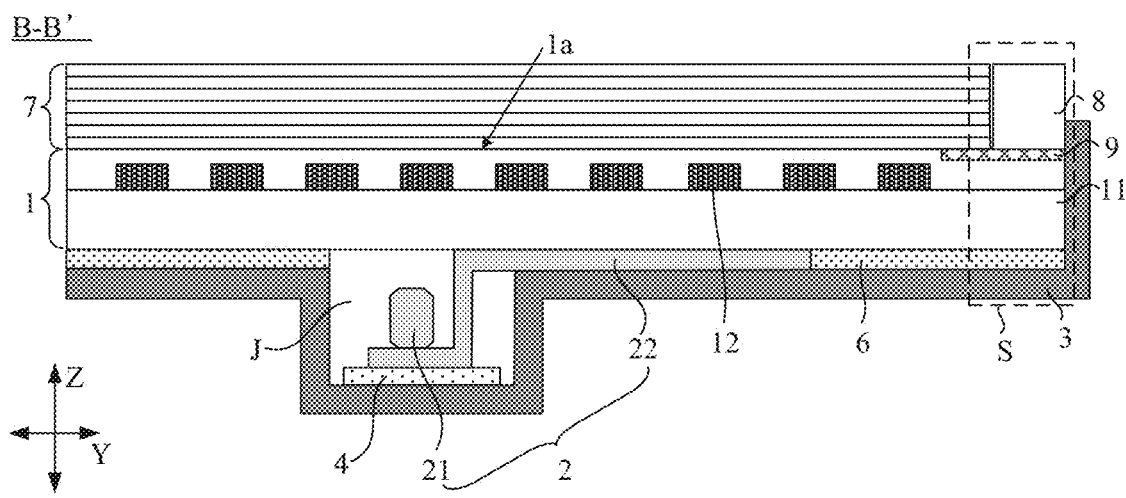
FIG. 13 is yet another sectional view of the backlight module in FIG. 3 taken along the section line B-B'.

In some embodiments, as shown in FIG. 13, the backlight module 10 further includes an optical adjustment film 7 and a mold frame 8.

The optical adjustment film 7 is disposed on the light exit side 1*a* of the light-emitting substrate 1. The optical adjustment film 7 is configured to adjust the light emitted by the light-emitting substrate 1.

For example, the optical adjustment film 7 may include one or more of at least one light homogenizing film, a composite prism, a color conversion film, and a brightness enhancement film. The light homogenizing film is configured to disperse the light emitted by the light-emitting substrate 1, so that the light emitted to the outside is more uniform, and the display effect is improved. The composite prism is used to gather light to avoid light scattering. The color conversion film may change the color of the light emitted by the light-emitting substrate 1; for example, blue light is converted into white light. The brightness enhancement film may increase the brightness of the light, thereby improving the display effect.

The provision of the optical adjustment film 7 may improve the quality of the light emitted by the backlight module 10, thereby improving the display effect of the display apparatus.

The mold frame 8 is arranged around the optical adjustment film 7. For example, four side surfaces of the optical adjustment film 7 are in contact with the mold frame 8. For example, the mold frame is designed to be in a shape of an annulus.

The mold frame 8 is configured to support and protect the optical adjustment film 7 in the backlight module 10. The mold frame 8 mainly plays a carrying role (carrying the optical adjustment film 7), and also fixes the films in the optical adjustment films 7 together to prevent them from loosening; furthermore, the mold frame 8 may assemble the external structure (e.g., a display panel) and the backlight module 10 together to obtain the display module.

As shown in FIG. 13, the mold frame 8 is disposed on the light exit side 1*a* of the light-emitting substrate 1. For example, as shown in FIG. 13, the side surface where the bonding side S of the light-emitting substrate 1 is located is flush with a side surface of the mold frame 8 away from the optical adjustment film 7.

In the related art, the mold frame is arranged on the side surface where the bonding side of the light-emitting substrate is located to surround both the light-emitting substrate and the optical adjustment film.

However, in the backlight module 10 provided by the embodiments of the present disclosure, after adopting the active driving mode, there is a need to perform bonding processes (including the bonding of the chip-on-chip film 2 and the light-emitting substrate 1 and the bonding of the second flexible circuit board 5 and the light-emitting substrate 1) in the bonding side S of the light-emitting substrate 1. In the backlight module 10 provided by the embodiments of the present disclosure, the mold frame 8 is arranged on the light exit side 1*a* of the light-emitting substrate 1, and the side surface where the bonding side S of the light-emitting substrate 1 is located is controlled to be flush with the side surface of the mold frame 8 away from the optical adjustment film 7, so that a width (a dimension in the direction Y) of the light-emitting substrate 1 is extended, and the design space of the surface of the backlight side 1*b* of the light-emitting substrate 1 is increased, so as to reserve a design space for bonding the light-emitting substrate 1 to each of the flexible film 22 and the second flexible circuit board 5.

In some embodiments, as shown in FIG. 13, the backlight module 10 further includes a second fixed adhesive layer 9 disposed between the light-emitting substrate 1 and the mold frame 8.

The second fixed adhesive layer 9 is configured to: fix the mold frame 8 to the light-emitting substrate 1 to fix the optical adjustment film 7 to the light exit side 1*a* of the light-emitting substrate 1; and fix the light-emitting substrate 1 to an external structure such as a display panel to achieve the assembly of the backlight module 10 and the external structure (e.g., a display panel) to obtain the display module.

For example, as shown in FIG. 13, a portion of the second fixed adhesive layer 9 is disposed between the optical adjustment film 7 and the light-emitting substrate 1, so that the optical adjustment film 7 is more firmly arranged on the light exit side 1a of the light-emitting substrate 1.

For example, as shown in FIG. 13, an end of the backplane 3 is bent toward the light-emitting substrate 1 and extends to the mold frame 8 via the side surfaces of the light-emitting substrate 1 and the second fixed adhesive layer 9 in sequence, which may further improve the strength of the side edge of the backplane 3, thereby increasing the strength of the side edge of the backlight module 10.

Figure 14:
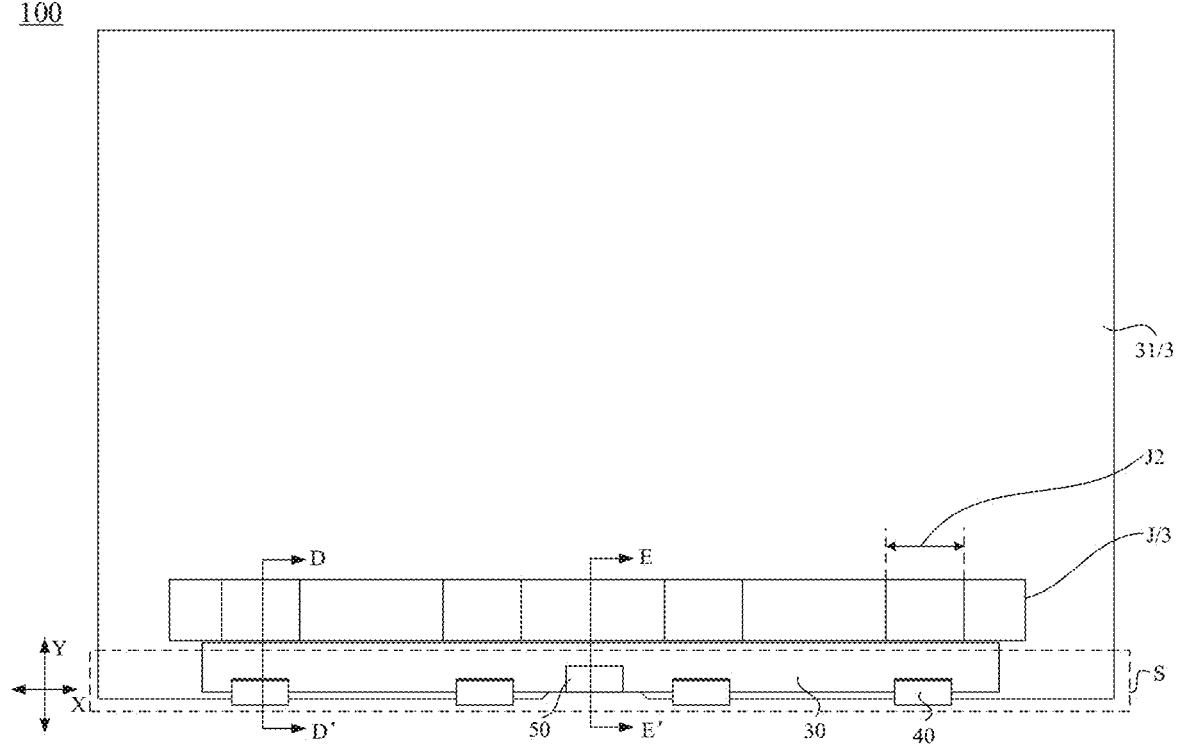
FIG. 14 is a rear view of a display module, in accordance with some embodiments.

As shown in FIG. 14, some embodiments of the present disclosure provide a display module 100.

Figure 15:
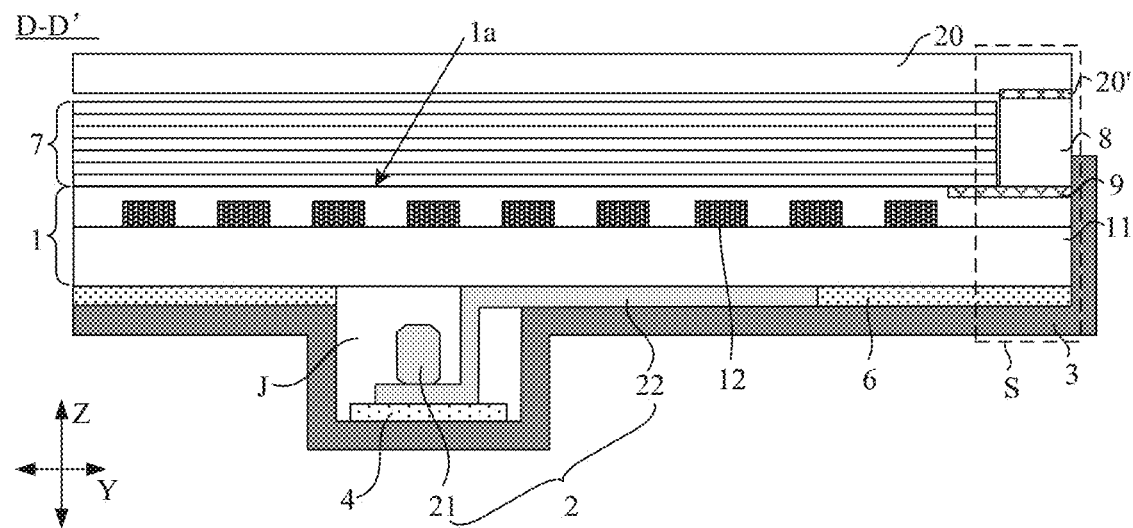
FIG. 15 is a sectional view of the backlight module in FIG. 14 taken along the section line D-D'.

As shown in FIG. 15, the display apparatus 100 includes a display panel 20 and the backlight module 10 in the above embodiments.

The display panel 20 is disposed on the light exit side 1a of the backlight module 10. For example, as shown in FIG. 15, the display module 100 further includes a foam tape 20', and the foam tape 20' is configured to fix the mold frame 8 to the display panel 20, so as to achieve the assembly of the display panel 20 and the backlight module 10 to obtain the display module 100.

For example, the display panel 20 may be a liquid crystal display (LCD) panel.

For example, the display panel 20 includes an array substrate, an opposite substrate, and a liquid crystal layer disposed between the array substrate and the opposite substrate. The opposite substrate is farther away from the backlight module 10 than the array substrate.

For example, the opposite substrate of the display panel 20 may include a color filter layer. The color filter layer includes at least red photoresist units, green photoresist units and blue photoresist units, and the red photoresist units, green photoresist units and blue photoresist units are configured to control the color of the light emitted by the display panel 20.

For example, the opposite substrate of the display panel 20 further includes black matrix patterns used for separating the red photoresist units, the green photoresist units and the blue photoresist units.

For example, the display panel 20 may further include a first polarizer disposed on a side of the opposite substrate away from the backlight module 10, and a second polarizer disposed on a side of the array substrate proximate to the backlight module 10.

Beneficial effects that can be achieved by the display module 100 in the embodiments of the present disclosure are the same as the beneficial effects that can is be achieved by the backlight module 10, and details will not be repeated here.

Figure 16:
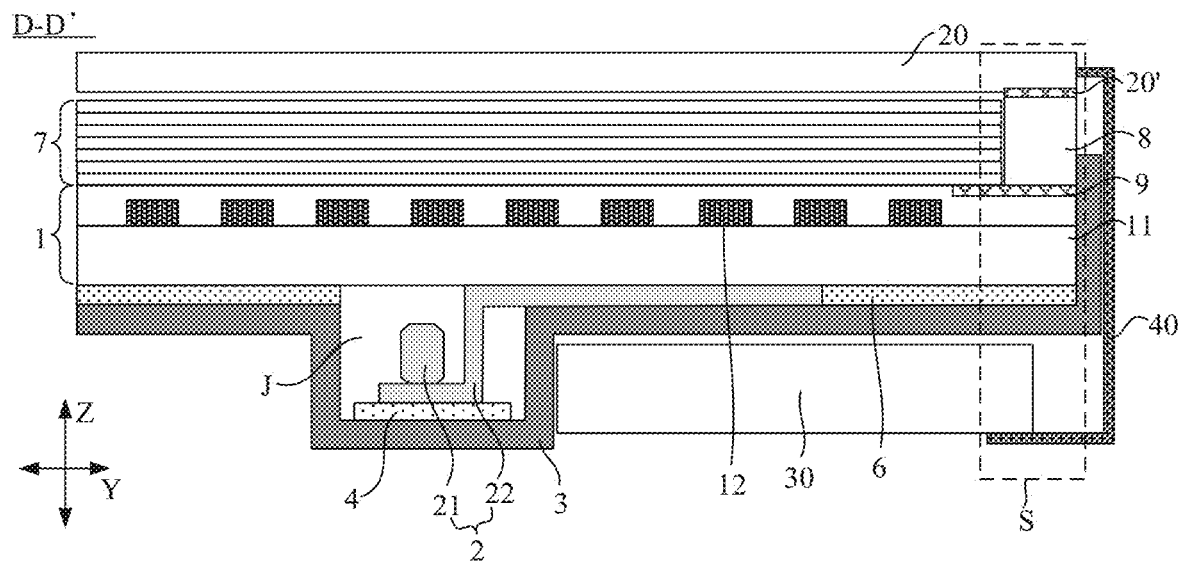
FIG. 16 is another sectional view of the backlight module in FIG. 14 taken along the section line D-F'.

In some embodiments, as shown in FIG. 16, the display module 100 further includes a circuit board 30.

The circuit board 30 is disposed on a side of the backlight module 10 away from the display panel 20, and the circuit board 30 is disposed at a side of the groove J of the backplane 3 of the backlight module 10.

For example, as shown in FIG. 16, the circuit board 30 is disposed at a side of the groove J proximate to the bonding side S of the light-emitting substrate 1.

By arranging the circuit board 30 at a side of the groove J, during an assembly process of the circuit board 30, the side edge of the groove J in the backlight module 10 may be used as a boundary to define the position of the circuit board 30, so that the laser engraving process for making reference lines is omitted to simplify the assembly process.

For example, in the display module 100 provided by the embodiments of the present disclosure, a thickness of the groove J may be approximately equal to a thickness of the circuit board 30, and the circuit board 30 is disposed at a side of the groove J proximate to the bonding side S of the light-emitting substrate 1.

The thickness of the groove J is approximately equal to the thickness of the circuit board 30, and the circuit board 30 is disposed at the side of the groove J proximate to the bonding side S of the light-emitting substrate 1. In this way, it is possible to prevent the design of the groove J from increasing the thickness of the entire display module 100, which is beneficial to achieve the design of the lightness and thinness of the display apparatus with the active driving mode.

For example, for the circuit board 30 provided by the embodiments of the present disclosure, a dimension in the first direction X, i.e., a length, of the circuit board 30 may be in a range of 260 mm to 300 mm, inclusive, such as 280 mm; and a dimension in the direction Y perpendicular to the first direction X, i.e., a width, of the circuit board 30 may be in a range of 10 mm to 14 mm, inclusive, such as 12 mm. Compared with the size (for example, the length is 280 mm and the width is 30 mm) of the circuit board in the related art, the circuit board 30 provided by the embodiments of the present disclosure occupies a smaller design space, which may reserve more design space for the display apparatus.

In some embodiments, as shown in FIGS. 14 and 16, the display module 100 further includes another flexible circuit board (also referred to as a third flexible circuit board below to distinguish different flexible circuit boards) 40, and the display panel 20 is electrically connected to the circuit board 30 by the third flexible circuit board 40.

For example, as shown in FIG. 16, an end of the third flexible circuit board 40 is led out from the display panel 20 and bent, and extends to the circuit board 30 via the side surface of the bonding side S to be electrically connected to the circuit board 30.

The circuit board 30 is configured to provide the display panel 20 with the required signals. For example, an electric field is provided for the liquid crystal layer in the display panel 20 to the control the liquid crystal, thereby achieving the control of the light emitted by the display panel 20.

In some embodiments, as shown in FIGS. 14 and 17, the display module 100 further includes a connector 50 disposed on a side of the circuit board 30 away from the backlight module 10.

For example, the connector 50 is provided with sockets therein, and the number of the sockets is the same as the number of pins of the second flexible circuit board 5, for example, both the number are 39.

As shown in FIG. 17, the second flexible circuit board 5 is inserted into the connector 50.

The circuit board 30 is electrically connected to the second flexible circuit board 5 of the backlight module 10, and the circuit board 30 is further configured to transmit a power supply signal (e.g., a positive voltage) and/or control signal to the second flexible circuit board 5, so that the power supply signal is transmitted to the light-emitting units 12 in the light-emitting substrate 1 through the second flexible circuit board 5, and the control signal is transmitted to the chip-on-film(s) 2, so as to achieve the light emission control for the light-emitting elements G in the light-emitting units 12 in the light-emitting substrate 1.

Figure 18:
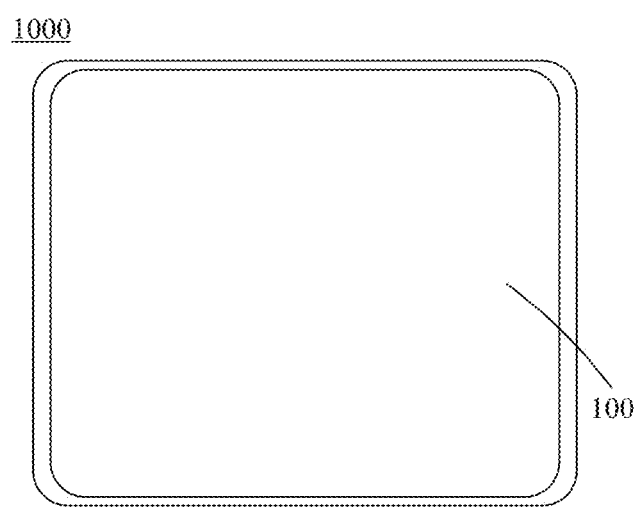
FIG. 18 is a top view of a display apparatus, in accordance with some embodiments.

As shown in FIG. 18, some embodiments of the disclosure provide a display apparatus 1000 including the display module 100 provided by the embodiments described above.

Beneficial effects that can be achieved by the display apparatus 1000 in the embodiments of the present disclosure are the same as the beneficial effects that can be achieved by the display module 100, and details will not be repeated here.

FIG. 18 is a top view of a display apparatus 1000 provided by some embodiments of the present disclosure. The display apparatus 1000 may be any device that can display images whether in motion (e.g., a video) or stationary (e.g., a still image), and regardless of text or image. More specifically, it is anticipated that the described embodiments may be implemented in or associated with a variety of electronic devices, such as (but not limited to), a mobile phone, a wireless device, a personal digital assistant (PDA), a virtual reality (VR) display, a hand-held or portable computer, a global positioning system (GPS) receiver/navigator, a camera, an MP4 video player, a video camera, a game console, a watch, a clock, a calculator, a television monitor, a flat panel display, a computer monitor, an automobile display (e.g., an odometer display), a navigator, a cockpit controller and/or display, a display of camera views (e.g., a display of a rear-view camera in a vehicle), an electronic photo, an electronic billboard or sign, a projector, a building structure, or a packaging and aesthetic structure (e.g., a display for displaying an image of a piece of jewelry).

The above are only specific embodiments of the present disclosure, but the scope of protection of the present disclosure is not limited thereto, and any person skilled in the art may conceive of variations or replacements within the technical scope of the present disclosure, which shall fall within the protection scope of the present disclosure. Therefore, the protection scope of the present disclosure should be determined by the protection scope of the claims.

What is claimed is:

1. A backlight module, comprising:
   a light-emitting substrate, including a signal line group and a plurality of light-emitting units, the plurality of light-emitting units being electrically connected to the signal line group;
   at least one chip-on-film arranged on a non-light exit side of the light-emitting substrate, the at least one chip-on-film being electrically connected to the signal line group;
   a backplane disposed on the non-light exit side of the light-emitting substrate, and the at least one chip-on-film being located between the backplane and the light-emitting substrate; wherein the backplane is provided with a groove therein, a notch of the groove faces the light-emitting substrate, and at least a portion of a chip-on-film film of the at least one chip-on-film is disposed in the groove; and
   a flexible circuit board, an end of the flexible circuit board being electrically connected to the light-emitting substrate,
   wherein the backplane is provided with a first opening therein, and another end of the flexible circuit board passes through the first opening and extends to a side of the backplane away from the light-emitting substrate.

2. The backlight module according to claim 1, wherein the chip-on-chip film includes:
   a flexible film electrically connected to the signal line group; and
   at least one driver chip electrically connected to the flexible film, the at least one driver chip being arranged in the groove.

3. The backlight module according to claim 2, wherein a sidewall of the groove is of a stepped structure; in a thickness direction of the light-emitting substrate and from the notch to a bottom surface of the groove, the sidewall of the groove includes a first sub-wall, a stepped surface and a second sub-wall that are connected in sequence, and the first sub-wall and the second sub-wall both intersect with the stepped surface;
   the groove includes at least one first sub-groove and at least one second sub-groove, a first sub-groove of the at least one first sub-groove includes the first sub-wall and the stepped surface, and a second sub-groove of the at least one second sub-groove includes the second sub-wall and at least a portion of the bottom surface of the groove; and
   a driver chip of the at least one driver chip is arranged in the second sub-groove, and at least a portion of the flexible film is arranged in the first sub-groove.

4. The backlight module according to claim 3, wherein the groove includes a plurality of second sub-grooves arranged in a first direction; the first direction is parallel to an extending direction of a side edge of a bonding side of the light-emitting substrate;
   the backlight module comprises a plurality of chip-on-films, and the plurality of chip-on-films are arranged in sequence in the first direction; wherein
   each of the plurality of chip-on-films includes at least one driver chip, and all driver chips included in a same chip-on-film are disposed in a same second sub-groove.

5. The backlight module according to claim 4, wherein the groove includes a plurality of first sub-grooves, the first sub-grooves and the second sub-grooves are arranged alternately in the first direction;
   each of the plurality of chip-on-films further includes a flexible film; of each of the plurality of chip-on-films, two side edges of the flexible film respectively exceed two side edges of the at least one driver chip in the first direction, and the two side edges of the flexible film are respectively located in two first sub-grooves located on two sides of a second sub-groove where the at least one driving chip is located.

6. The backlight module according to claim 2, further comprising:
   a heat dissipation layer disposed between a bottom surface of the groove and the at least one driver chip, the heat dissipation layer being connected to the bottom surface of the groove.

7. The backlight module according to claim 1, wherein the backplane includes a backplane body, the backplane body is arranged around the groove, and a top of a sidewall of the groove is connected to the backplane body; and
   in a thickness direction of the light-emitting substrate, a bottom surface of the groove is farther away from the light-emitting substrate than the backplane body.

8. The backlight module according to claim 1, wherein the first opening is located at a side of the groove proximate to a side edge of a bonding side of the light-emitting substrate.

9. The backlight module according to claim 1, further comprising:
   a first fixed adhesive layer disposed between the light-emitting substrate and the backplane, the first fixed adhesive layer being arranged avoiding the groove and the at least one chip-on-film.

10. The backlight module according to claim 1, further comprising:
   an optical adjustment film disposed on a light exit side of the light-emitting substrate; and
   a mold frame arranged around the optical adjustment film, the mold frame being disposed on the light exit side of the light-emitting substrate.

11. The backlight module according to claim 10, further comprising:
   a second fixed adhesive layer disposed between the light-emitting substrate and the mold frame.

12. A display module, comprising:
   the backlight module according to claim 1; and
   a display panel disposed on a light exit side of the backlight module.

13. The display module according to claim 12, further comprising:
   a circuit board disposed on a side of the backlight module away from the display panel and disposed at a side of the groove of the backplane of the backlight module; wherein the circuit board is electrically connected to the flexible circuit board of the backlight module.

14. The display module according to claim 13, further comprising:
   another flexible circuit board, the display panel being electrically connected to the circuit board through the another flexible circuit board.

15. The display module according to claim 13, further comprising:
   a connector disposed on a side of the circuit board away from the backlight module; wherein the flexible circuit board is inserted into the connector.

16. A display apparatus, comprising the display module according to claim 12.

17. The backlight module according to claim 1, wherein the light-emitting substrate has a bonding side, and each of the at least one chip-on-film is bonded to the light-emitting substrate at the bonding side of the light-emitting substrate.

18. The backlight module according to claim 4, wherein the plurality of chip-on-films are of a one-piece structure.

19. The display module according to claim 13, wherein a thickness of the groove is approximately equal to a thickness of the circuit board.

* * * * *